United States Patent [19]

Lin et al.

[11] 4,090,984

[45] May 23, 1978

[54] SEMI-CONDUCTIVE COATING FOR GLASS FIBERS

[75] Inventors: Kingso C. Lin; Donald J. Hammond, both of Newark, Ohio

[73] Assignee: Owens-Corning Fiberglas Corporation, Toledo, Ohio

[21] Appl. No.: 772,605

[22] Filed: Feb. 28, 1977

[51] Int. Cl.$^2$ ............................................. H01B 1/06
[52] U.S. Cl. .................................. 252/511; 338/214; 260/29.6 R; 260/42.55; 174/102 SC
[58] Field of Search ................... 252/511; 338/214; 174/102 SC; 260/29.6 R, 42.55

[56] References Cited

U.S. PATENT DOCUMENTS

| 3,310,513 | 3/1967 | Barie, Jr. et al. | 260/29.6 R |
|---|---|---|---|
| 3,637,563 | 1/1972 | Christena | 260/29.6 R |
| 3,991,397 | 11/1976 | King | 252/511 X |
| 4,001,159 | 1/1977 | Imai et al. | 260/29.6 R X |

*Primary Examiner*—Benjamin R. Padgett
*Assistant Examiner*—E. Suzanne Parr
*Attorney, Agent, or Firm*—Ronald C. Hudgens; Philip R. Cloutier; Dennis M. Kozak

[57] ABSTRACT

A semi-conductive coating for glass fibers is disclosed, the coating comprising at least one polyacrylate emulsion, a conductive carbon black dispersion and a thixotropic gelling agent. The coating being suitable for application to glass fiber roving employed to produce electrical cables.

9 Claims, No Drawings

SEMI-CONDUCTIVE COATING FOR GLASS FIBERS

This invention relates to glass fiber roving.

More specifically, this invention relates to conductive cores for electrical cables.

In one of its more specific aspects, this invention relates to semi-conductive coatings superimposed over sized glass fiber roving employed to produce conductive cores for electrical cables.

The use of glass fiber roving to produce conductive cores for electrical cables, such as automobile spark ignition cables, is well known. For example, see U.S. Pat. No. 3,991,397. Also known is the employment of a semi-conductive coating to hold the glass fiber roving together and to protect it from the heat generated by automobile engines.

This invention provides a novel semi-conductive coating which is particularly suitable for the above described application.

According to this invention there is provided an aqueous coating composition comprising at least one polyacrylate emulsion, a conductive carbon black dispersion and a thixotropic gelling agent.

Also, according to this invention there is provided a semi-conductive coating produced by removing water from an aqueous composition comprising at least one polyacrylate emulsion, a conductive carbon black dispersion and a thixotropic gelling agent.

In a preferred embodiment, the aqueous composition of this invention will comprise: at least one polyacrylate emulsion, a conductive carbon black dispersion, a thixotropic gelling agent, a surfactant and a defoamer.

Any suitable polyacrylate emulsion can be employed in the aqueous composition of this invention.

Particularly suitable polyacrylate emulsions comprise copolymers of alkyl acrylates and acrylonitrile.

Various polyacrylate emulsions are commercially available and can be employed in the practice of this invention, for example, those designated by the tradename "Rhoplex", commercially available from Rohm & Haas Company. Particularly suitable are "Rhoplex TR-621" and "Rhoplex K-14".

"Rhoplex TR-621" is a self-crosslinking, polyacrylate anionic emulsion which comprises a copolymer of ethylacrylate and acrylonitrile. "Rhoplex TR-621" has a pH of about 3.5, a solids content of about 56.5%, a specific gravity at 25° C of about 1.06, and a viscosity of 350 cps measured at 25° C on a Brookfield Viscometer, Model No. LVF (#1 spindle, 12 rpm).

"Rhoplex K-14" is a self-crosslinking, polyacrylate non-ionic emulsion which comprises a copolymer of ethylacrylate and acrylonitrile. "Rhoplex K-14" has a pH of about 3.0, a solids content of about 46%, a specific gravity at 25° C of about 1.03, and a viscosity of 200 cps measured at 25° C on a Brookfield Viscometer, Model No. LVF (#1 spindle, 12 rpm).

In the aqueous composition of this invention, the polyacrylate emulsion will be present in a total amount within the range of from about 40 to about 80 parts per 100 parts by weight of the aqueous composition.

In a preferred embodiment, the aqueous composition of this invention will comprise both an anionic polyacrylate emulsion employed in an amount within the range of from about 40 to about 70 parts and a non-ionic polyacrylate emulsion employed in an amount within the range up to about 20 parts per 100 parts by weight of the aqueous composition.

Any suitable conductive carbon black dispersion can be employed in the aqueous composition of this invention.

Suitable conductive carbon black dispersions are those comprising electrically conductive carbon black dispersed in from about 3 to about 4 percent by weight of a suitable dispersing agent.

Various electrically conductive carbon blacks are commercially available and can be employed in the carbon black dispersions employed in this invention, for example, "Conductex 950" and "Conductex SC" commercially available from the Columbian Division of Cities Service Company and "Vulcan XC-72R" commercially available from the Special Blacks Division of Cabot Corporation.

A particularly suitable carbon black is "Conductex 950". "Conductex 950" has a blackness index of 116, a particle diameter 21 m$\mu$, a surface area of 245 square meters per gram and an apparent density of 10 pounds/cubic foot.

Any suitable dispersing agent can be employed to disperse the electrically conductive carbon blacks usable in this invention.

A particularly suitable carbon black dispersion suitable for use in the practice of this invention is a dispersion of "Conductex 950" and a dispersing agent comprising the condensation product of naphthalene sulfonic acid and formaldehyde such that, the solids content of the dispersion is about 34%.

In the practice of this invention, the conductive carbon black dispersion will be employed in an amount within the range of from about 20 to about 40 parts per 100 parts by weight of the aqueous composition.

Any suitable thixotropic gelling agent can be employed in the aqueous composition of this invention. Suitable thixotropic gelling agents include acid-containing acrylic emulsion copolymers and cellulose esters.

A particularly suitable acid-containing acrylic emulsion copolymer is designated "Acrysol ASE 108", commercially available from Rohm & Haas Co. "Acrysol ASE 108" has a solids content of 20%, a pH of 2.9, a Brookfield Viscosity, Model No. LVF (#1 spindle, 12 rpm) at 25° C of 200 cps, and is anionic.

Other suitable acid-containing acrylic emulsion copolymers are designated "Acrysol ASE 60", "Acrysol ASE 75", and "Acrysol ASE 95", all commercially available from Rohm & Haas Co.

Particularly suitable cellulose esters are methylcellulose, ethylcellulose, hydroxypropyl methylcellulose, mixture thereof, and the like. The cellulose esters employable in the aqueous composition of this invention are commercially available from The Dow Chemical Company under the tradename "Methocel".

In the practice of this invention, the thixotropic gelling agent will be employed in an amount within the range of from about 1 to about 10 parts per 100 parts by weight of the aqueous composition.

Additionally, if an acid-containing acrylic emulsion copolymer such as "Acrysol ASE 108" is employed as the thixotropic gelling agent in an aqueous composition of this invention, it may be necessary to introduce into the aqueous composition a suitable base such as ammonium hydroxide in order to neutralize the acidic functional groups on the acid-containing acrylic emulsion copolymer. If employed, ammonium hydroxide will be present in an amount within the range of from about 1 to about 5 parts per 100 parts by weight of the aqueous composition.

Any suitable surfactant can be employed in the aqueous composition of this invention.

Particularly suitable surfactants are commercially available under the tradename "Tergitol" from Union Carbide and "Igepal" from GAF Corporation. Representative of the commercially available surfactants usable in the practice of this invention are "Tergitol 15-S-12" and "Igepal CO-630".

"Tergitol 15-S-12" is a polyethylene glycol ether of a linear alcohol and is non-ionic.

"Igepal CO-630" is a nonylphenoxypoly (ethyleneoxy) ethanol and is also non-ionic.

In the practice of this invention, the surfactant will be employed in an amount within the range of from about 1 to about 5 parts per 100 parts by weight of the aqueous composition.

Any suitable defoamer can be employed in the aqueous composition of this invention.

Particularly suitable defoamers comprise blends of emulsifiable mineral oils, silica derivatives and esters.

Various defoamers, usable in the practice of this invention are commercially available, for example, "Drew Defoamers" available from the Drew Chemical Company. Reference is hereby made to U.S. Pat. No. 3,408,306 which discloses a defoamer which comprises a blend of emulsifiable mineral oils, silica derivatives and esters, which defoamer has been assigned the trade name "Drew Y-250 Defoamer" and is particularly suitable for use in this invention.

In the practice of this invention, the defoamer will be employed in an amount within the range of from about 0.1 to about 1 part per 100 parts by weight of the aqueous composition.

Water will comprise the balance of the composition.

The aqueous composition of this invention is prepared by conventional methods such as that described below. The composition can be applied to any glass fiber roving, the number of strands depending upon the particular end application of the resulting conductive core. However, a suitable roving for automobile ignition cables will comprise about 60 strands of about 204 fibers, each. The aqueous composition can be applied to the glass fiber roving, which roving is preferably conductive and overcoated with a matrix of uniformly spaced non-conductive glass fiber strands (overbraid) as described in U.S. Pat. No. 3,991,397, using any suitable process, for example, a dipping process also described in U.S. Pat. No. 3,991,397, such that upon drying, the residue of the aqueous composition comprises from about 10 to about 20 percent by weight of the total weight of the glass fiber roving, the glass fiber strand overbraid and the residue.

Having described the ingredient of this invention, reference is now made to the following examples which are provided by way of illustration and not by way of limitation of the practice of this invention.

EXAMPLE I

This example demonstrates, in parts per 100 parts by weight, the best mode for producing a semi-conductive coating composition of this invention.

About 48 parts of "Rhoplex TR-621" and about 5 parts of "Rhoplex K-14" were introduced into the main mix tank at room temperature and with agitation.

About 3 parts of "Tergitol 15-S-12" and about 5 parts of water were heated to a temperature of from about 150° to about 170° F in a first premix vessel with agitation. Agitation was continued for about 20 minutes and the contents of the first premix vessel were introduced into the main mix tank with agitation.

About 35 parts of a carbon black dispersion comprising "Conductex 950" and a dispersing agent comprising the condensation product of naphthalene sulfonic acid and formaldehyde such that, the solids content of the dispersion was about 34%, were introduced into the main mix tank with agitation and the contents of the main mix tank were agitated for about 30 minutes.

About 0.5 part of ammonium hydroxide was diluted with about 0.5 part of water and introduced into the main mix tank with agitation.

About 1 part of "Drew Y-250 Defoamer" and about 1 part of water were added to a second premix vessel with agitation. Next, the contents of the second premix vessel were added to the main mix tank with agitation.

About 0.75 part of "Acrysol ASE 108" and about 0.2 part of water were added to the main mix tank with agitation.

The contents of the main mix tank were agitated for about 45 minutes and recovered as an aqueous semi-conductive coating composition of the invention. The composition was found to have a pH of about 9.5, a total solids content of about 42%, and a viscosity of 3400 cps as measured on a Brookfield Viscometer, Model No. LVF (#4 spindle, 10 rpm).

EXAMPLE II

This example demonstrates the preparation of a conductive core comprising the semi-conductive coating of Example I.

Substantially the procedure described in U.S. Pat. No. 3,991,397 was followed, using the coating of Example I rather than the coating described in the patent. Also, the oven temperature was set at about 650° F instead of 750° F. A first stripper die of 060 mil. and a second stripper die of 070 mil. were employed.

The resulting conductive core was tested and found to have a loss on ignition, upon drying, of about 16%, a resistance of about 4220 ohm/ft and was found to maintain its initial properties, including degree of flexibility, after being subjected to heat aging at 350° F for 5 days.

It will be seen from the above data that glass fiber roving overcoated with a semi-conductive coating of this invention is suitable for employment in electrical cable.

It is evident from the foregoing that various modifications can be made to this invention, for example, the semi-conductive coating composition of this invention can be employed as a size composition and applied to glass fibers at forming. Such modifications are considered as being within the scope of this invention.

What is claimed is:

1. An aqueous coating composition comprising at least one polyacrylate emulsion, a conductive carbon black dispersion and a thixotropic gelling agent said polyacrylate emulsion comprising a copolymer of an alkylacrylate and acrylonitrile.

2. The composition of claim 1 in which said alkylacrylate comprises ethylacrylate.

3. The composition of claim 1 in which said thixotropic gelling agent is selected from the group consisting of acid-containing acrylic emulsion copolymers and cellulose esters.

4. The composition of claim 3 in which said cellulose esters are selected from the group consisting of methylcellulose, ethylcellulose and hydroxypropyl methylcellulose.

5. The composition of claim 1 comprising in parts per 100 parts by weight of said composition, said polyacrylate emulsion in a total amount within the range of from about 40 to about 80 parts, said conductive carbon black dispersion in an amount within the range of from about 20 to about 40 parts and said thixotropic gelling agent in an amount within the range of from about 1 to about 10 parts.

6. The composition of claim 1 comprising an anionic polyacrylate emulsion and a non-ionic polyacrylate emulsion.

7. The composition of claim 6 comprising in parts per 100 parts by weight of said composition, said anionic polyacrylate emulsion in an amount within the range of from about 40 to about 70 parts and said non-ionic polyacrylate emulsion in an amount within the range up to about 20 parts.

8. The composition of claim 1 also comprising in parts per 100 parts by weight of said composition, a surfactant in an amount within the range of from about 1 to about 5 parts and a defoamer in an amount within the range of from about 0.1 to about 1 part.

9. A semi-conductive coating comprising the residue produced by removing water from the aqueous coating composition as defined in claim 1.

* * * * *